United States Patent [19]

Abascal

[11] 4,130,211

[45] Dec. 19, 1978

[54] TRAILER LOADING AND UNLOADING SYSTEM

[76] Inventor: Jose M. Z. Abascal, Arrieta 3-3°, Pamplona (Navarra), Spain

[21] Appl. No.: 809,540

[22] Filed: Jun. 24, 1977

[30] Foreign Application Priority Data

Jul. 10, 1976 [ES] Spain .................................. 449749
Feb. 14, 1977 [ES] Spain .................................. 226473

[51] Int. Cl.² .............................................. B60P 1/04
[52] U.S. Cl. ................................. 214/505; 214/517; 280/80 B; 280/493
[58] Field of Search ....................... 214/505, 506, 517; 280/80 B, 406, 493, 494

[56] References Cited

U.S. PATENT DOCUMENTS

| 2,717,707 | 9/1955 | Martin | 214/505 |
| 2,815,223 | 12/1957 | Wharton | 280/406 R |
| 3,462,033 | 8/1969 | Pioch | 214/505 |
| 3,606,059 | 9/1971 | Haberle | 214/517 X |
| 3,624,786 | 11/1971 | Lundahl | 214/505 |
| 4,051,968 | 10/1977 | Massey | 214/506 |

Primary Examiner—Robert G. Sheridan
Attorney, Agent, or Firm—Eyre, Mann, Lucas & Just

[57] ABSTRACT

A trailer has a platform whose center of gravity may be placed forward or rearward of its support. When the center of gravity is in the rearward position the platform is enabled to tilt its rear end to the ground to facilitate loading or unloading. A cable arrangement pulls the load up the sloping platform onto the platform. The center of gravity is positioned forward of the support to travel.

7 Claims, 13 Drawing Figures

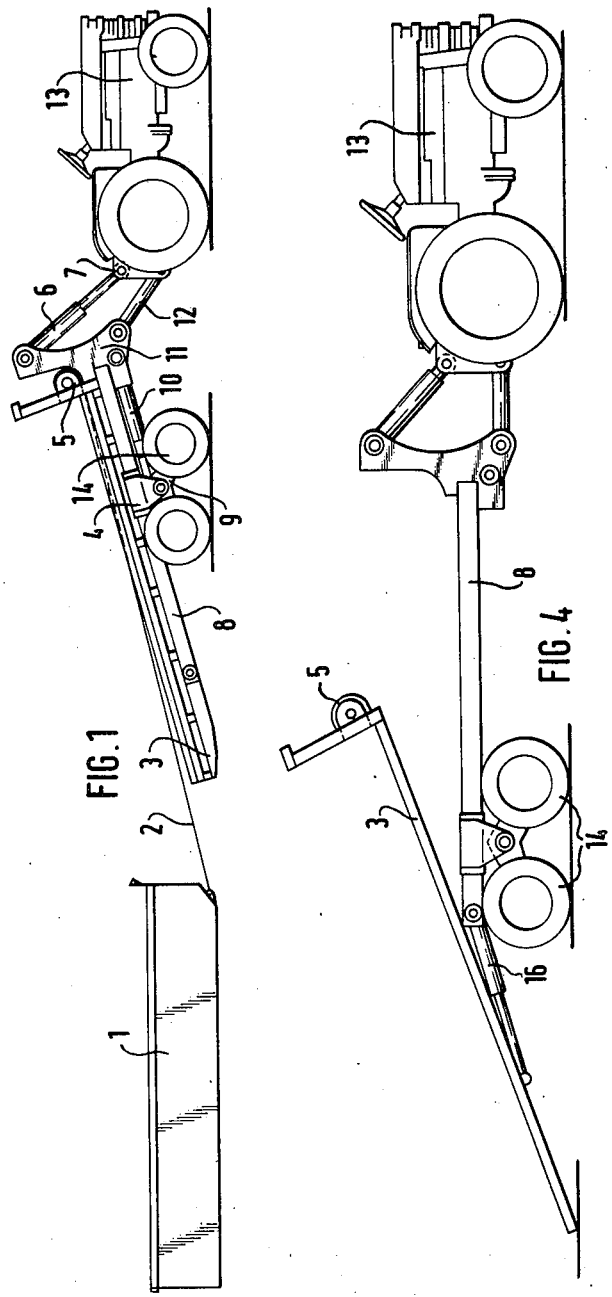

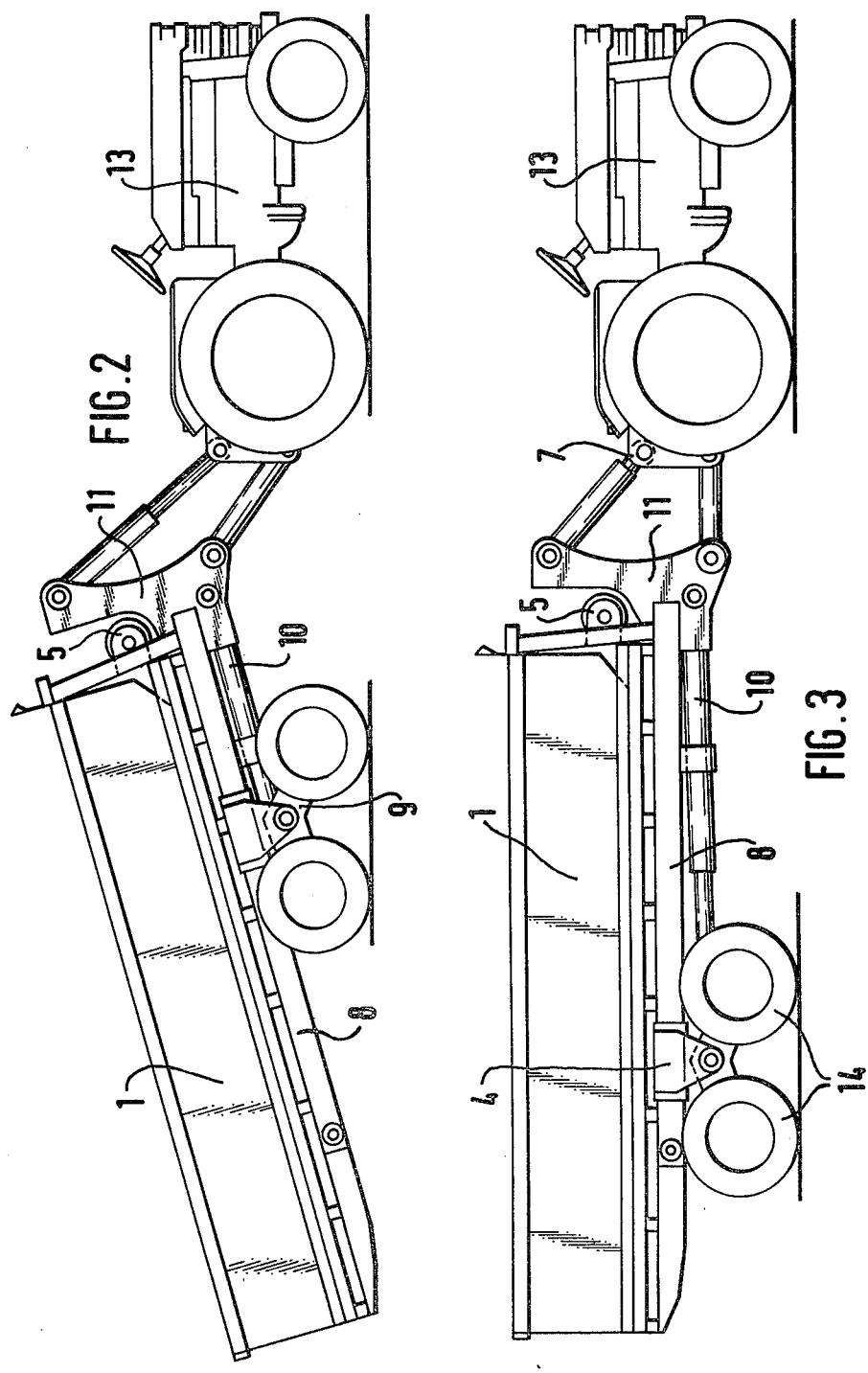

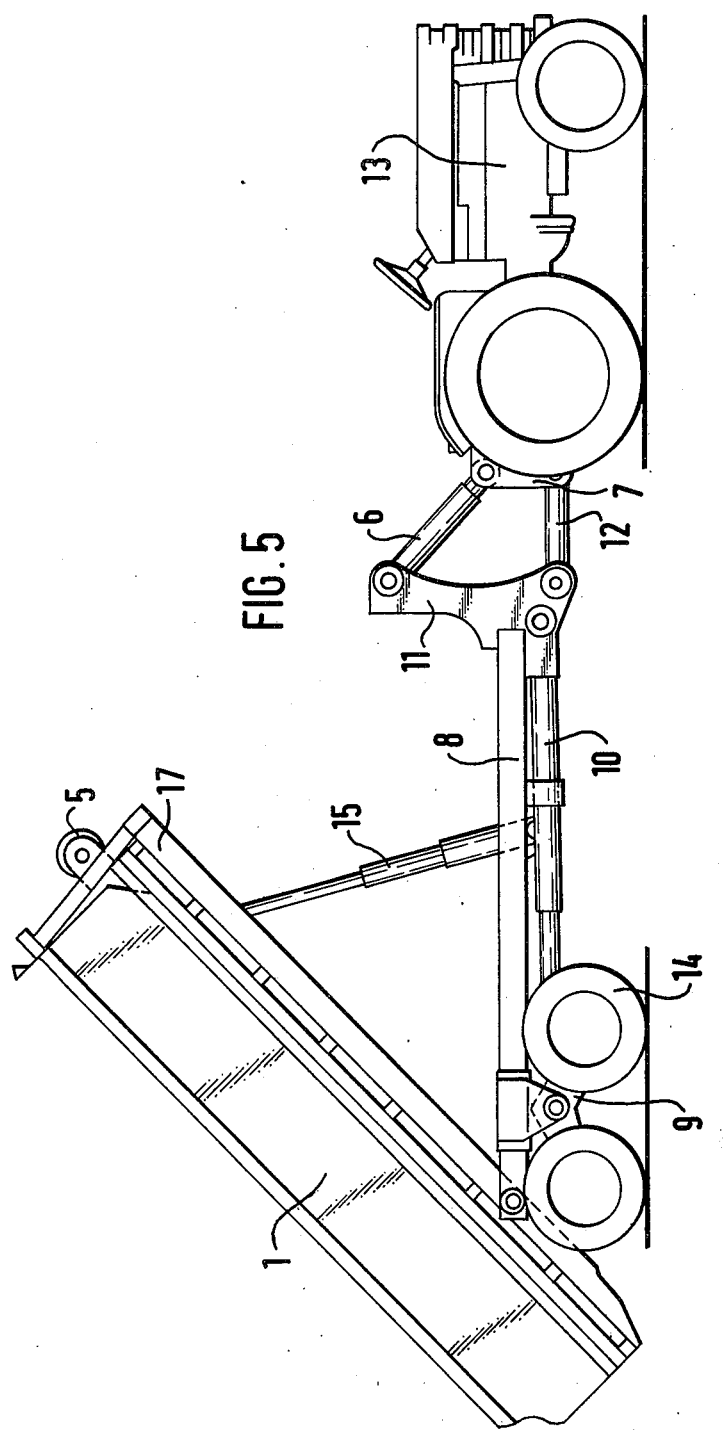

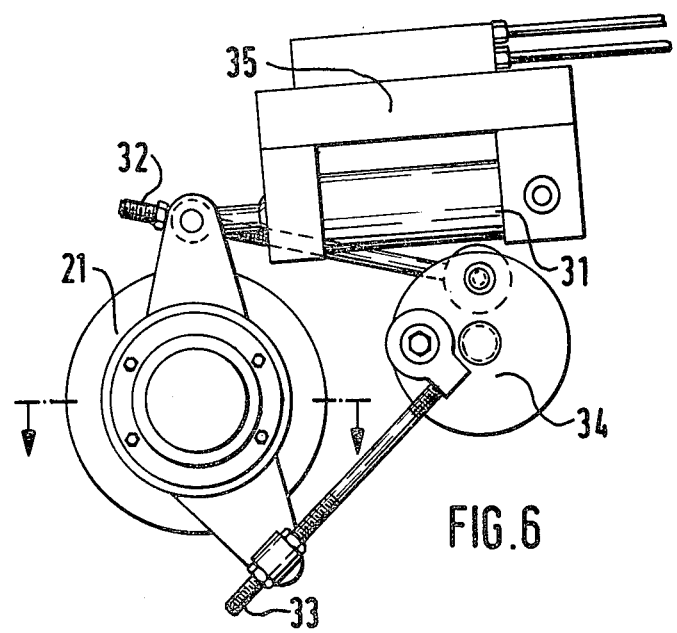
FIG. 6
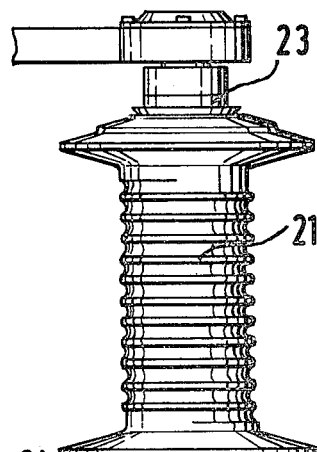
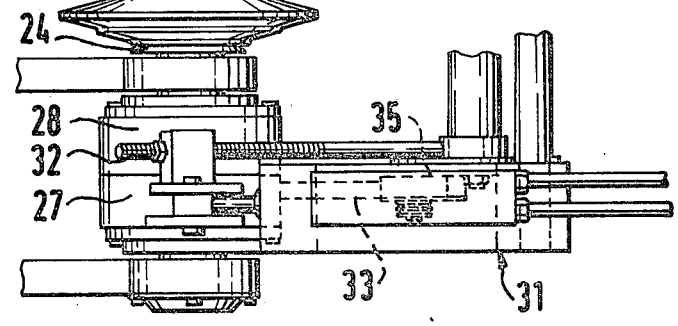
FIG. 7

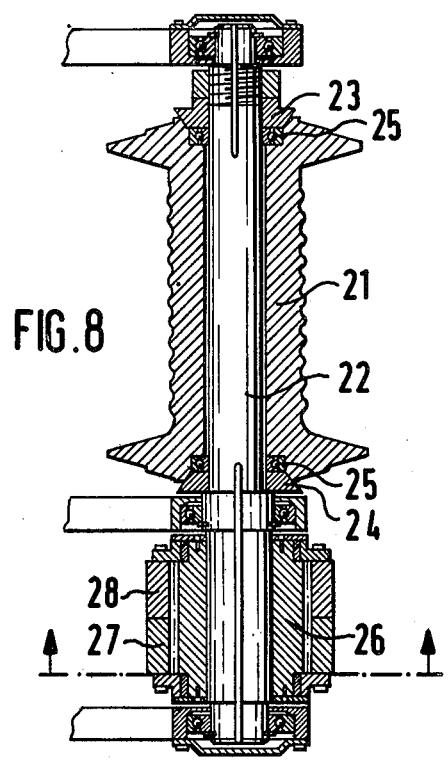
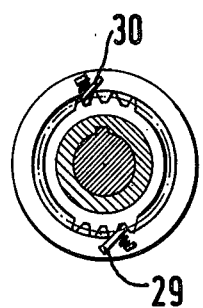

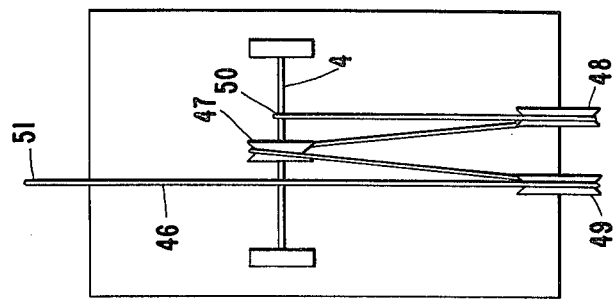
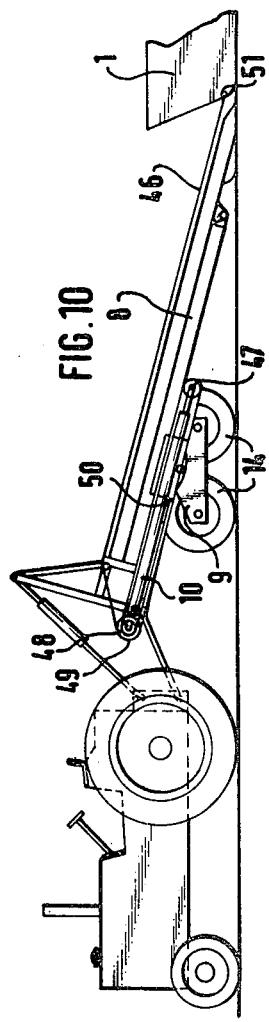
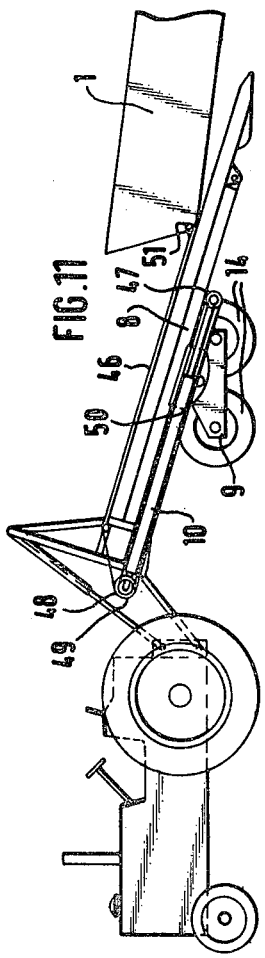
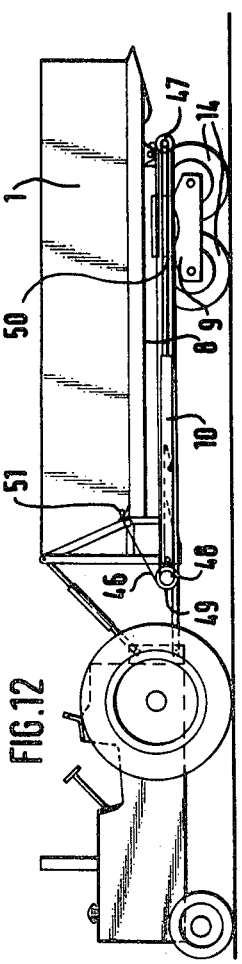

TRAILER LOADING AND UNLOADING SYSTEM

Trailers as are today available on the market may be of the single or the twin axle design, according to their purpose, load carrying capacity, etc., but in general they have features which make it a laborious procedure for them to be loaded and unloaded, there being several solutions which have been adopted to overcome this problem, among which, those that stand out as being the most practical, there is the design where the trailer body is attached to the chassis, but it is so in such a manner that it can be tipped; and of an even more practical nature, is the design employing containers which are independent from the trailer itself, but where even so, there are still difficulties in the task of loading and unloading.

Essentially, the system covered by the invention here is featured because of the fact that the trailer body or chassis is tipped backwards into an inclined position, until the rear comes into contact with the ground and rests upon it, and hence alters the position of the centre of gravity with respect to the support afforded by the set or sets of wheels, to the extent that said centre of gravity becomes located upon or beyond the rearmost of the axles on the trailer. Such movement of the position of the centre of gravity may be achieved either by a forward movement of the axles or sets of wheels which are to the rear of it in the assembly, or by lengthening the chassis rearwards by means of a moveable top framework upon the chassis, or by a combination of both these procedures, so that in other words there is a relative displacement between the rearmost wheel-carrying axle on the trailer, and all parts of the trailer body, as the result at least of a displacement or travelling motion between them.

Whichever of these cases above may be applied, the system covered by this invention is such as to allow the trailer chassis or body to be placed in a very advantageous position in order for the load to be slid upon it, since the small angle of inclination with which this position can be achieved, and the fact that the rear end is resting on the ground, means that the load in question can be easily drawn up from the ground and deposited upon the chassis, but at the same time the angle is sufficiently steep so as to enable unloading to take place unaided.

In order to fulfil these purposes, there is a head which is rigidly attached to the forward end of the trailer chassis, and there is a pair of pivoted arms, of which one is joined to the bottom of the head and the other is joined to the top, whose purpose is to form the means whereby the trailer is fixed to the tractor which draws it along, they each being attached thereto at a respective point.

Such an arrangement of parts ensures a safe and efficient attachment of the trailer to the tractor, where the lower of the arms acts as the actual two-bar, whereas the upper one restrains the load which the trailer imposes upon the tractor, and together they make up a flexible attachment assembly, allowing the trailer to be tipped rearwards without the need of its being unhooked from the tractor.

In accordance with one of the features of the invention, the tow-bar arm is an extending bar, which allows the attachment to be made with the required distance separating the trailer from the tractor, while the upper arm is a double-acting shock-absorbing cylinder which, in addition to its function as a support to restrain the load, causes the tipping motion of the trailer to be carried out smoothly, and avoids sudden falls in either direction.

As a source of power for loading and unloading, the trailer is equipped with a winch, comprising a double-acting hydraulic plunger, whose motion in either direction is transmitted to a reel, where the rope attached to the loads to be moved is wound.

The motion from the cylinder is transmitted to the reel by means of two ratchets fitted to the shaft for the reel, and arranged so that each is operative in the opposite direction from the other, and these ratchets turn the linear motion of the plunger in the cylinder into rotation of the shaft, either of the two acting while the other is idle, according to whether the plunger is moving on an inward or outward stroke.

With another alternative arrangement, the means for loading and unloading comprise the attachment of at least one sheave in the moveable support for the trailer wheels, and at least two further sheaves mounted on the forward end of the chassis structure, and where a rope is reeved over said sheaves, one of whose ends being firmly secured to said support for the trailer wheels, while its other end is arranged for attachment to the container holding the load.

This system, just exactly as it is envisaged, is applicable to any trailer, either with a single or with twin axles, and likewise to any kind of container as may be specifically designed for different applications, and it therefore allows for a wide range of uses, with the advantage moreover of its being exceedingly simple to handle, and having a very short operating time, so that the trailer may be employed for some other purpose or transport job, whilst the material to be carried by it is being loaded into another container.

FIG. 1 shows a tractor-trailer assembly in accordance with the system dealt with by this invention, in position ready for being loaded.

FIG. 2 shows the assembly where the container-load is located in position upon the trailer.

FIG. 3 shows the assembly with its load in position ready for travelling.

FIG. 4 depicts a similar assembly in accordance with another construction.

FIG. 5 shows an assembly where the trailer is equipped with a tipping body on the chassis.

FIG. 6 depicts an elevational view of the winch covered by the invention.

FIG. 7 is the corresponding plan view of said winch.

FIG. 8 is a view across the section shown in FIG. 6.

FIG. 9 is a view across the section shown in FIG. 8.

FIG. 10 illustrates a trailer in accordance with the invention, at the initial stage in the loading procedure.

FIG. 11 shows the same trailer at an intermediate stage in the loading procedure.

FIG. 12 is an illustration of the trailer after completion of the loading procedure.

FIG. 13 shows the reeving of a draw rope to pull up a load onto the trailer.

In accordance with the construction illustrated in FIGS. 1, 2 and 3, the trailer to which the system in question is applied, is comprised of a chassis (8), and a set of wheels (14), where these latter are mounted upon a suspension rocker arm (9), this in turn being secured to the chassis (8) by means of trunnion (4) which is arranged so as to be able to travel along the length of said chassis (8), through the action of a cylinder (10).

At the front end of said chassis (8) there is a two-head (11) securely mounted, from which attachment to the structure (7) on the towing tractor (13) is made by means of a tow bar (12), and an arm (6), which latter is preferably comprised of a double-acting shock-absorbing cylinder.

With all this arrangement as described, wheels (14) may be travelled forwards by means of operation of cylinder (10), whereupon the trailer tips about rocker arm (9), and its rear end comes into contact with the ground and rests there, while in this tipping motion, cylinder (6) acts as a shock-absorber, and prevents any sudden blow against the ground at the end of the descending motion.

The trailer is equipped with a winch (5) placed at its forward end, whose rope (2) is able to perform a pulling motion, and draws towards chassis (8), any load deposited on the ground and placed upon the rear end of the trailer when this is in the rearward tipped position, and such system may be used for any kind of loads, but it preferably handles containers (1) holding the load to be carried.

FIG. 6 shows a reel (21) carrying a rope (not illustrated) for attachment to the loads to be moved, this reel (21) being mounted in a way that it may rotate freely upon a shaft (22), and between the former and the latter there is a tapered clutch with two end bushes (23 and 24) with their respective ball bearings (25), this clutch being capable of being operated by hand to release or engage reel (21) with shaft (22) to prevent or make the former revolve with the latter, while moreover said clutch may also be remotely or hydraulically controlled.

Ratchet body (26) is additionally mounted on shaft (22) and rotates integrally with it, there being two separate sleeves (27 and 28) affixed to said body, each provided with rocking teeth (29) which, through pressure exerted by their respective springs (30), engage and mesh with body (26).

Said ratchet sleeves (27 and 28) are pivotally attached to the plunger-piston in a double-acting hydraulic cylinder (31). Ratchet (27) is directly joined to the plunger, whilst ratchet (28) is joined to one end of rod (33).

One end of rod (32) is joined to the plunger in cylinder (31), and the opposite ends of said rods (33 and 32) are joined and linked with one another by means of wheel (34), in such a manner that the former ratchet (27) becomes operative when the plunger in cylinder (31) travels on its forward stroke, whilst the latter ratchet (28) becomes operative when the plunger travels on its return stroke.

These ratchets (27 and 28) however, are assembled so that they operate in opposition to one another, and hence, although they are each driven by an opposite motion, they both transmit said motion in the same direction to body (26), so that shaft (22) receives a continuous rotational motion.

With this arrangement, and when there is a hydraulic flow being fed to cylinder (31), this is made to travel at a constant rate in one direction or the other, due to the presence of a distributor (35) which is mechanically or hydraulically controlled, and thus the motion from the cylinder (31) is transmitted in the respective direction to ratchets (27 and 28), and these transmit the continuous rotational motion to spindle (22).

When spindle (22) is rotating, it is then only necessary to engage tapered clutch (23 and 24) in order to make reel (21) rotate too, which thereupon exerts a pull on the rope in order to shift the load which requires to be moved.

Unloading is performed in a similar fashion, with the wheels (14) being displaced forwards to the extent that the rear end of the chassis (8) comes into contact with the ground, and then, once container (1) has been released from the safety catches which secure it to the trailer, it will slide down towards the ground, and become deposited there when tractor (13) is shifted forwards.

In accordance with the other system (as shown by FIGS. 10, 11, 12, and 13), a draw rope (46) is provided, being reeved in a loop over a sheave (47) attached to trunnion (4), and over a further two sheaves (48 and 49) arranged on the front end of the chassis structure (8), with one of the ends belonging to said draw rope (46) being firmly secured to a point (50) on trunnion (4), whence the draw rope (46) is reeved over the front sheave (48), and it then returns to the rear sheave (47), and the free end (51) of this draw rope (46) is attached to the load or container (1).

In this manner, when the trailer is suitably positioned in front of the load or container (1), and is tipped into the inclined position, with the end (51) of the draw rope (46) being secured to said load or container (1), if the hydraulic cylinder (10) begins to make wheels (14) travel to their normal position as for when the trailer is in tow, then draw rope (46) will become taut in its length between point (51) and sheave (49), while it will lengthen between said sheave (48), and between this latter and point (50), with the result that there is a shortening of the distance between point (51) where the end of the rope (46) is secured, and sheave (49), and said shortening will be equivalent to three times the distance travelled by platform (3) with respect to chassis (8), and the maximum take up (that is, the position in which container (1) is fully loaded onto the trailer) is accomplished when cylinder (10) comes to the end of its stroke, and trunnion (4) has returned to its position for travelling in tow, whereupon the trailer will have assumed a fully horizontal position.

In order for the trailer to be unloaded, it is simply necessary for cylinder (10) to be actuated in order for it to make the trailer come into the tipped position, whereupon the container (1) will slide rearwards under its own weight, until it touches the ground, and it is then fully freed from the trailer when this is drawn forwards by the tractor which tows it. Throughout this unloading operation, rope (46) acts as a restraint, and prevents the load (1) from dropping suddenly.

It is to be understood that this same displacement effect with respect to the centre of gravity, in order to cause the trailer to tip, may be accomplished using other constructions of the invention, among which is that depicted by FIG. 4, where wheels (14) are not displaced rearwards, and instead the trailer is designed so as to be equipped with a top framework (3) upon the chassis, this being capable being travelled rearwards by means of an actuating cylinder (16), so that when the centre of gravity of the travelling body becomes located beyond the rear end of the chassis (8), said top framework (3) will drop and come into contact with the ground where it will rest, and thus assume an inclined position for loading and unloading like that which has already been described.

The load is deposited upon a framework which can either be a simple chassis (8) as in FIG. 3, or it can be a top framework (3) as in FIG. 4, which in turn is supported upon the basic chassis (8).

Whatever arrangement may be used for the parts comprising the construction, the system covered by this invention is applicable both to trailers having a single axle as well as to those having more than one, with the wheels arranged either in one or in several sets, and likewise mechanical, pneumatic or other actuating means may be used instead of the hydraulic means as are referred to in the above description, and moreover it is to be noted that the system is equally applicable to lorries, especially with the construction where a top framework is adopted to slide upon the chassis.

Furthermore, when it is of interest, the trailer may be equipped with a tipping top framework (17) (see FIG. 5) provided with a cylinder (15) to raise it, and such an arrangement may, among others, serve the purpose of assisting the initial sliding of the container (1) towards the ground in the unloading operation, since it allows the angle of inclination to be increased.

Finally, in the case of applications in forestry, the trailer is used with the same features as mentioned, although in a preferred form it is intended that the container employed be comprised of two longitudinal stringers having the same length as the chassis (8) belonging to the trailer, and at whose forward end there is a fixed upright board, while the tail-board at the rear is hinged and removeable, so that in this way the timbers to be loaded may be arranged as in a bale upon the two stringers lying on the ground, whereupon the container can be inserted beneath the bale, and the tailboard raised, so as thus to allow the loading operation to be performed in the same manner as has already been described.

I claim:

1. In a trailer loading and unloading system for use with a tractor and a trailer, said trailer being of the type having a chassis, said chassis being supported on a set of wheels, said trailer having means for displacing said wheels forward or rearward with respect to the center of gravity of said chassis including any load thereupon whereby said chassis and load are urged by gravity to tilt rearward or forward respectively, the improvement comprising:
   (a) a tow head rigidly attached to the front end of said chassis;
   (b) a towing structure rigidly attached to the rear end of said tractor;
   (c) a rigid tow bar pivotably attached at its first end to a first point on said towing structure and pivotably attached at its second end to a second point on said tow head;
   (d) double-acting shock absorber means for retarding motion pivotably attached at its first end to a third point on said towing structure and pivotably attached at its second end to a fourth point on said tow head;
   (e) said first and third points being vertically spaced apart, said second and fourth points being vertically spaced apart;
   (f) said third and fourth points being higher than said first and second points;
   (g) the vertical distance between said second and fourth points being substantially greater than the vertical distance between said first and third points;
   (h) said shock absorber means being extensible in the rearward tilting direction of said chassis and being operative to restrain the rate of tilting of said chassis whereby a sudden fall of the rear of said trailer is avoided; and
   (i) said shock absorber means having a fixed minimum length, the front of said trailer being supported against said shock absorber means at its minimum length whereby the maximum forward tilt of said trailer is fixed.

2. The trailer loading and unloading system as recited in claim 1 further comprising hauling means for hauling a load onto said trailer when said chassis is tilted rearward.

3. The system recited in claim 2 wherein said hauling means comprises:
   (a) a reel on a shaft;
   (b) a double-acting hydraulic cylinder;
   (c) two ratchets on said shaft;
   (d) said two ratchets being connected to said hydraulic cylinder and being operative to urge said reel in a single direction alternately with the alternate motion of said double-acting hydraulic cylinder;
   (e) a rope member on said reel, said reel being adapted to wind said rope member upon it; and
   (f) said rope being adapted to connection to said load.

4. The trailer loading and unloading system as recited in claim 2 wherein said hauling means is a winch connected at the forward end of said chassis and a cable from said winch for attachment to and hauling of said load.

5. The trailer loading and unloading system as recited in claim 1 further comprising:
   (a) said means for displacing being a double acting cylinder having first and second ends;
   (b) said first end being connected to said chassis and said second end being connected to said set of wheels;
   (c) at least a first sheave attached to displace with said set of wheels;
   (d) at least second and third sheaves attached to said chassis;
   (e) a rope;
   (f) multi-part reeving of said rope over at least said first, second and third sheaves;
   (g) a first end of said rope being attached to said trailer and a second end of said rope being free and having means for attachment to said load;
   (h) said multi-part reeving being operative to extend said rope second end when said set of wheels are displaced toward their forward position and to draw in said rope when said wheels are displaced toward their rearward position; and
   (i) the extending and drawing in of said rope second end being in the ratio of at least three times the displacement of said wheels.

6. The trailer loading and unloading system as recited in claim 5 further comprising the second end of said rope being drawn in to a position which places said load in its final forward position on said chassis when said wheels are in their extreme rearward position.

7. The trailer loading and unloading system as recited in claim 5 wherein said multi-part reeving comprises:
   (a) the rope first end being connected to move with said wheels; and
   (b) said rope being reeved from said first end over said second sheave, then over said first sheave, then over said third sheave and thence toward the rear of said trailer.

* * * * *